March 21, 1939. G. H. ACKER 2,151,176
VALVE CONTROL
Filed Feb. 2, 1937 3 Sheets-Sheet 1

INVENTOR.
George H. Acker
BY Fay, Oberlin & Fay
ATTORNEYS.

March 21, 1939.　　　　G. H. ACKER　　　　2,151,176
VALVE CONTROL
Filed Feb. 2, 1937　　　3 Sheets-Sheet 2

INVENTOR.
George H. Acker
BY Fay, Oberlin & Fay
ATTORNEYS

March 21, 1939.  G. H. ACKER  2,151,176
VALVE CONTROL
Filed Feb. 2, 1937  3 Sheets-Sheet 3
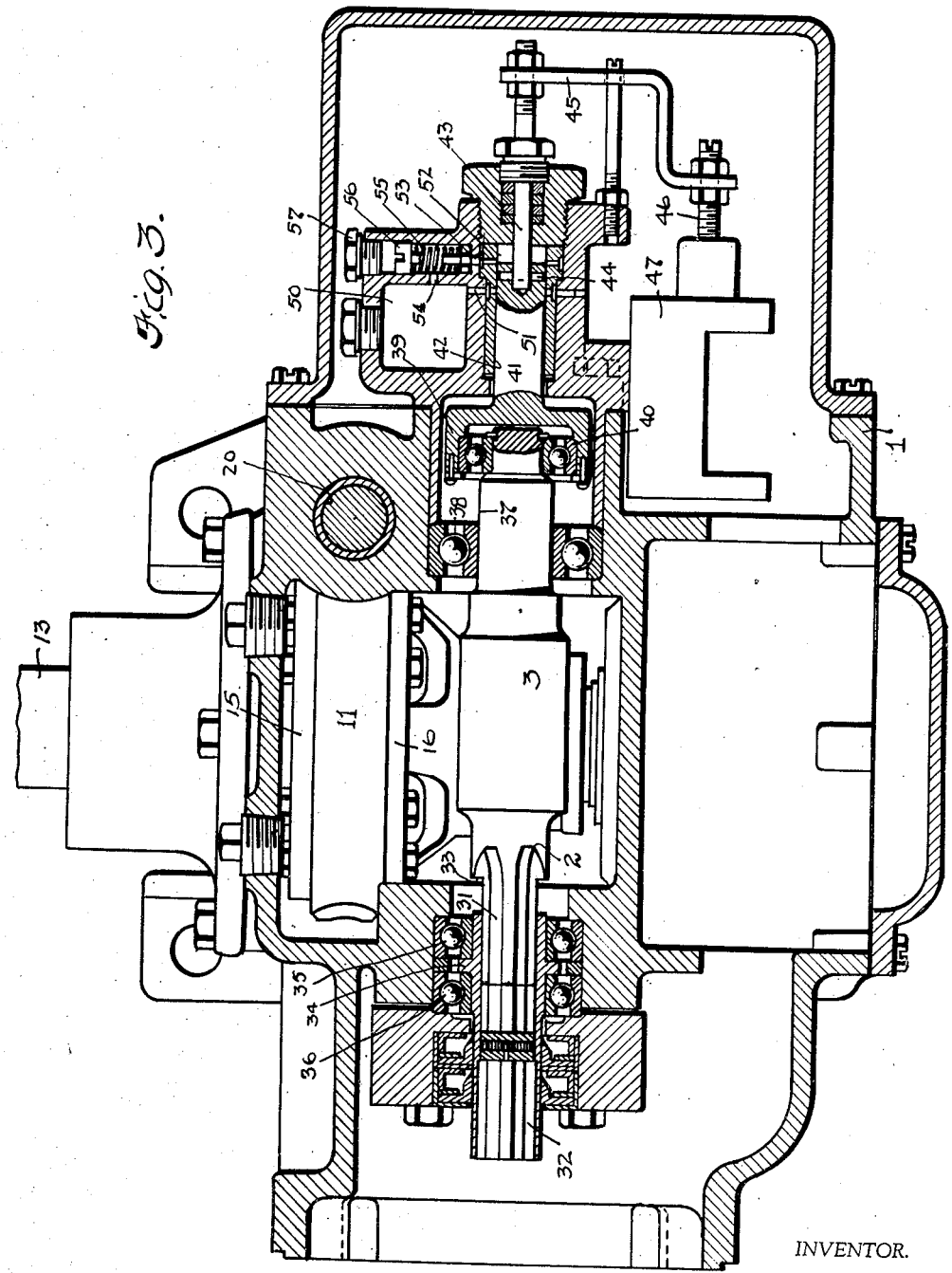
INVENTOR.
BY George H. Acker
Fay, Oberlin & Fay
ATTORNEYS.

Patented Mar. 21, 1939

2,151,176

UNITED STATES PATENT OFFICE 2,151,176

VALVE CONTROL

George H. Acker, Shaker Heights, Ohio, assignor to The Cleveland Worm & Gear Company, Cleveland, Ohio, a corporation of Ohio Application February 2, 1937, Serial No. 123,735

3 Claims. (Cl. 74—282)

The present invention relates to a motor driven, remote control unit for operating valves of the gate or globe type, for example, wherein the opening and closing action of the valve element, such as a gate or disk, is dependent upon the movement of a valve stem. The general object and nature of my invention is to provide such a valve control unit having improved characteristics of operation, and in particular, means for accommodating the increased power or torque which is required upon the operation of the valve in that portion of opening and closing stroke when the valve element, such as the head, disk or gate, is brought into and removed from immediate contact with the valve seat.

One of the objects of my invention is to provide a lost motion means effective to impart a "running start" of the mechanism of the control unit before positive connection is made with the valve stem as the valve is being removed from its seat; or, in other words, means to impart a "hammer blow" action to the valve opening operation of the control unit. Another object of my invention is to provide a novel and improved form of torque control means, whereby the driving power of the control unit, during the period of operation when the valve is brought into contact with the valve seat, is maintained within certain uniform, desired limits and is applied to the valve and valve stem in such a manner as to secure an adequately firm seating of the valve without injury to the latter or to the mechanism of the valve control unit.

To the accomplishment of the foregoing and related ends, said invention, then, consists of the means hereinafter fully described and particularly pointed out in the claims, the annexed drawings and the following description setting forth in detail certain mechanism embodying the invention, such disclosed means constituting, however, but one of various mechanical forms in which the principle of the invention may be used.

Figure 1:
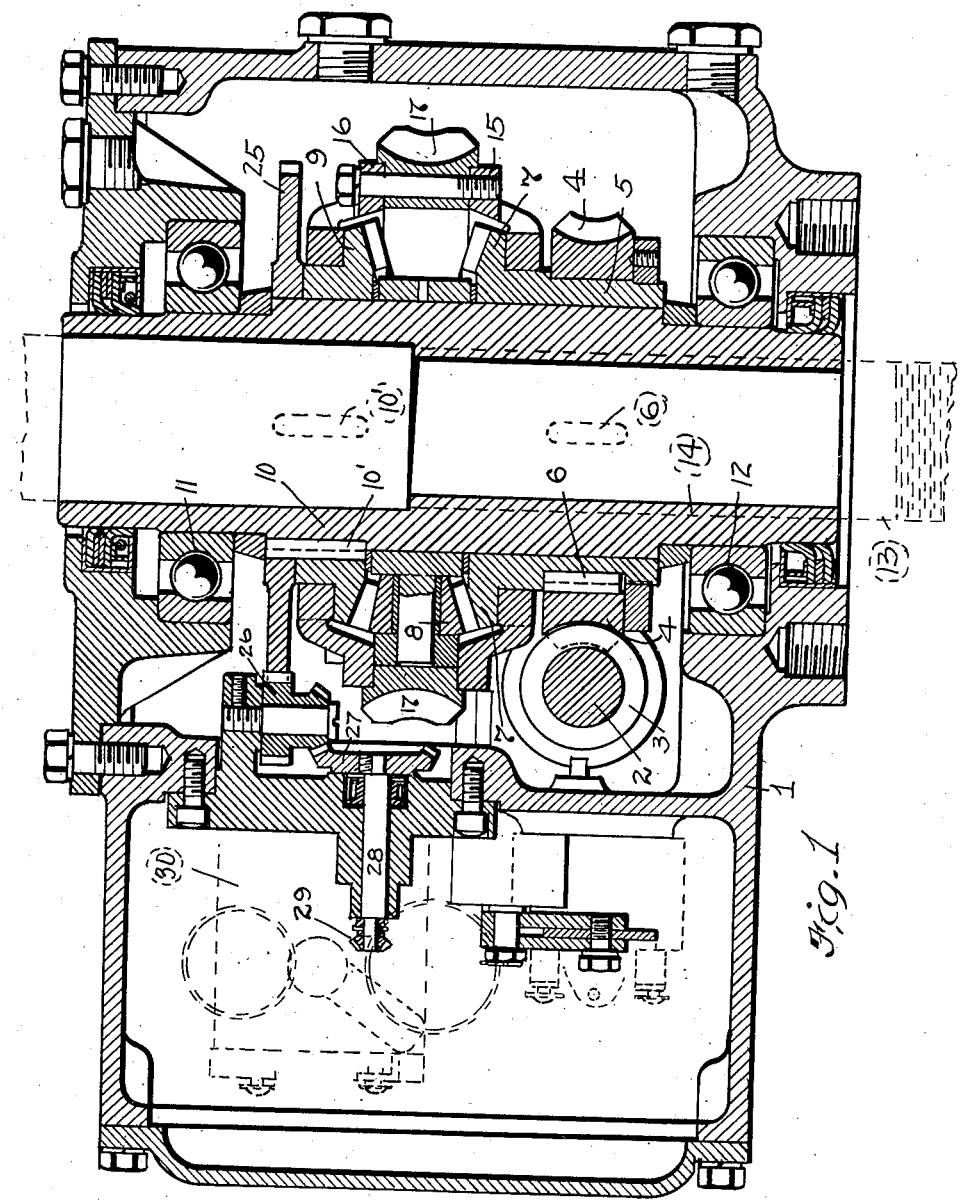
Figure 2:
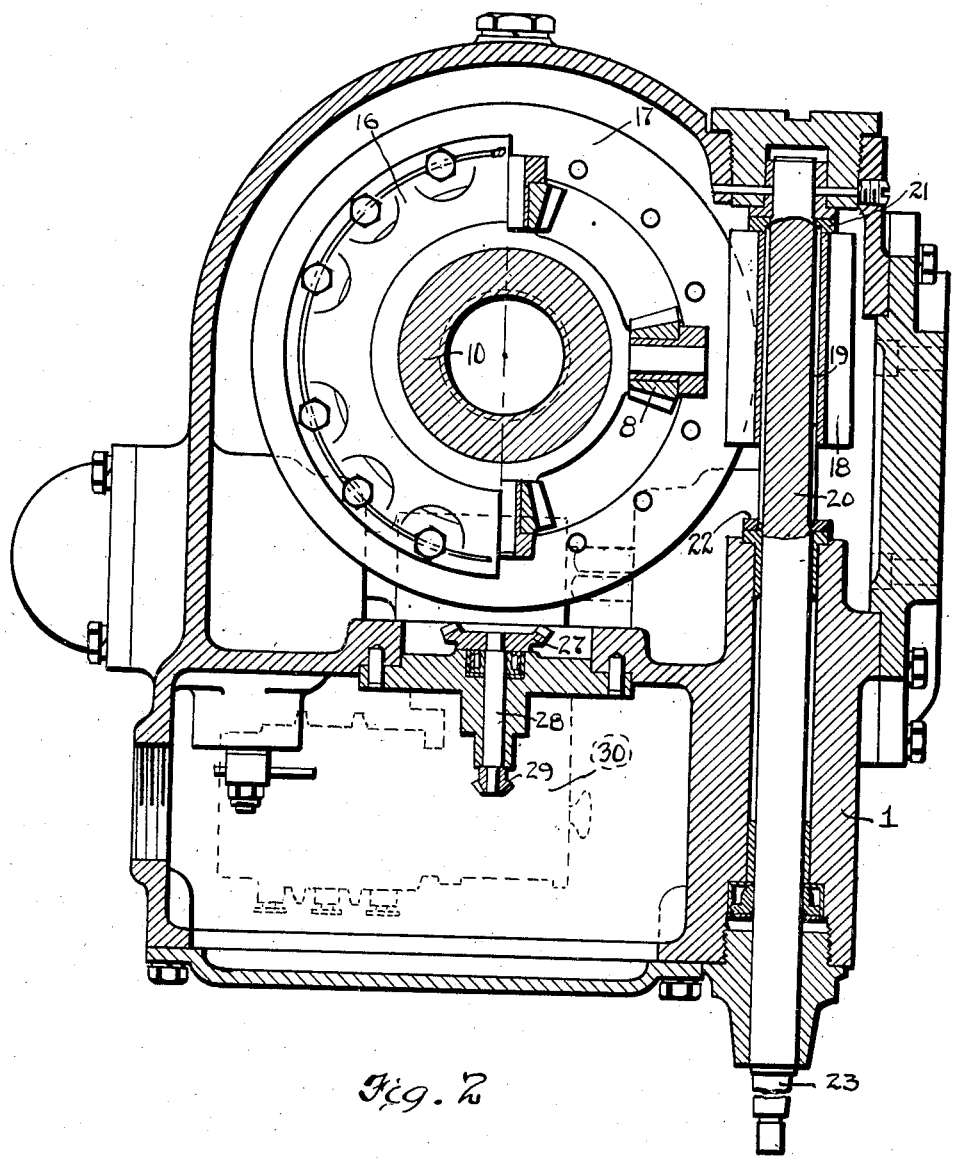

In said annexed drawings:

Fig. 1 is a sectional view of a device illustrating the principle of my invention and taken substantially in a plane through the center line of the valve stem shaft ; Fig. 2 is a sectional view of the device and taken substantially in a plane through the center line of the manually operated shaft; Fig. 3 is a sectional view of the device taken substantially in a plane through the center line of the worm drive shaft; each one of said figures being taken upon planes normal to each other.

Now, referring more particularly to the drawings, the device shown therein comprises a housing indicated generally by the numeral 1. A worm shaft 2 carrying the worm 3 is connected to an electric drive motor (not shown) in any suitable manner, which worm reduction gear units are customarily connected to their power source. The worm 3 meshes with the worm gear 4 which is keyed by means of the keys 6 to the skirt or flange 5 of one of the side gears 7 of a differential gear unit. The side gear 7 of the differential gear unit meshes with the pinion gears 8 which in turn mesh with the other side gear 9 of the differential. The side gear 9 is keyed to the main sleeve, hollow shaft, or quill 10 by means of the keys 10'. The quill 10 is supported adjacent each end in the housing 1 by means of the ball bearings 11 and 12.

As shown by the dotted lines in Fig. 1, a valve stem or valve stem shaft 13, leading to the valve to be operated (not shown), is threadably engaged in the interior of the quill 10 by suitable means such as by screw threads, indicated at 14. The valve stem 13 is keyed against rotation at some suitable point within the valve.

The halves 15 and 16 of the casing of the differential gear unit are bolted to each other by suitable studs (as best illustrated in Fig. 1) and are clamped to the worm gear 17.

Directing attention to Fig. 2, the worm gear 17 meshes with a worm 18 having a splined bore 19 engaging with a complementary spline of the handwheel shaft 20. The end thrust washers 21 and 22 are mounted on the shaft 20 and are spaced from each other at a distance greater than the length of the worm 18, so that the latter is free to have an axial travel along the shaft 20.

One end of the shaft 20 extends exteriorly of the casing 1 and is so designed, as indicated at 23, as to receive a hand wheel for manual operation of the shaft 20. Referring back to Fig. 1, a limit switch drive gear 25 is also keyed to the quill 10 adjacent the side gear 9. The drive gear 25 meshes with a smaller gear 26 which in turn drives through the bevel gear set 27 to the limit switch drive shaft 28. The pinion 29 on the drive shaft 28 in turn connects to the electric limit switch 30, indicated by the dotted lines in Figs. 1 and 2. The manner of operation and details of construction of such an electrical limit switch are well known to those skilled in the art and hence are not here set forth in further detail.

The operation of that portion of the apparatus, which has heretofore been described, is as follows:

Assuming that the valve stem 13 is in closed valve position and the valve control unit is energized from a remote control source for the purpose of opening the valve, power will be applied from the drive motor through the worm shaft 2 and worm 3 to rotate the worm gear 4, which in turn will rotate the side gear 7 of the differential gear unit. Since the other side gear 9 of the differential gear unit is connected directly to the load through the quill 10, there will be an initial tendency for the differential casing and the worm gear 17 carried by it to rotate. Such initial rotation of the worm gear 17 will be transmitted into axial movement of the worm 18 along the handwheel shaft 20. But as soon as the worm 18 reaches the end of its axial travel by abutment against either one of the thrust washers 21 or 22, further rotation of the worm gear 17 is stopped since the pitch of the threads between the worm 18 and worm gear 17 is such as to give a self-locking effect. In other words, the worm 18 and worm gear 17 are so designed that power or torque can be transmitted through them in one direction only, namely, from the worm to the worm gear and not vice versa. The same design and mode of operation is true with respect to the worm 3 and worm gear 4.

Now, as the worm gear 17 is locked against further rotation, power is transmitted from the side gear 7 through the pinion gears 8 to the side gear 9 to the quill 10, to move the shaft 13 and open the valve. The limit switch drive gear 25 operates to actuate the limit switch 30 after a predetermined number of rotations of the quill 10 and corresponding movement of the valve stem 13 and to stop the drive motor.

In the event of emergency, such as failure of electrical power or of the electric drive motor, the handwheel shaft 20 is capable of operating the device in a manner similar to the just described, power driven mode of operation. When the emergency handwheel shaft 20 is used to operate the device, the side gear 7 will be locked against rotation by virtue of the self-locking design of the worm 3 and worm gear 4. Initial rotation of the handwheel shaft 20 will be effective to again axially slide the worm 18 along the shaft until it abuts against either one of the thrust bushings 21 or 22. After such axial movement of the worm 18 and the limitation thereof by virtue of end contact with the thrust bushings, rotative hand power applied through the shaft 20 will be effective to rotate the worm gear 17 and the differential half casings 15 and 16 with the result that the side gear 9 will be driven through the pinion gears 8 walking around the locked side gears 7. Rotation of the side gear 9, of course, results in rotation of the quill 10 and valve stem shaft 13.

Now, directing attention to Fig. 3, the power-driven worm shaft 2 has a splined end 31 fitting in the interiorly splined coupling sleeve 32. A shoulder 33 on the spline 31 of the worm shaft 2 is adapted to abut against the end of the coupling 32. An integral flange 34 on the coupling 32 fits between the inner races of the thrust bearings 35 and 36. The outer races of these bearings are fitted into the housing 1. The splined coupling 32 is, of course, connected to the drive motor. The right-hand end 37 of the worm shaft 2 is slidably journalled in a bearing 38 and is connected to a cup-shaped member 39 by means of the floating thrust bearing 40. The inner race of the thrust bearing 40 is suitably keyed against axial movement of the shaft end 37 and the outer race of the thrust bearing 40 is axially locked to the cup-shaped member 39.

The cup-shaped member 39 is integral with a piston 41 in the cylinder 42. The piston 41 is connected to a connecting rod 43 by means of a transverse dowel pin 44. The connecting rod 43 extends through the end of the cylinder 42 through a packing gland and carries a switch trip lever 45 on its outer end. The trip lever 45 in turn is connected to the switch trip stud 46 adapted to operate the electrical torque control switch 47. The torque control switch 47 is, of course, connected in the drive motor circuit in the customary manner and is operable to stop the drive motor upon actuation of the switch.

A reservoir 50 is located immediately above the cylinder 42 and is in communication therewith through the inlet port 51. An outlet port 52 leads from the cylinder 42 to the plug valve 53. A return port 54 leads from the chamber of the plug valve 53 to the reservoir 50. The plug valve 53 is spring-loaded with the compression spring 55 and the latter can be adjustably regulated by means of the adjusting screw cap 56. A threaded plug 57 can be removed to give access to the screw cap 56. Suitable fluid, such as light oil or glycerine, is placed in the reservoir 50.

The operation of the last described parts of the apparatus is as follows:

Assuming that the parts, as shown in Fig. 3, are in such position resulting from movement of the valve stem 13 to closed position of the valve and that power is applied through the drive motor and worm shaft 2 to move the valve stem to open position, the end thrust created on the worm 3 and worm shaft 2 will first be effective to move the latter in a left-hand direction with respect to Fig. 3, until the shoulder 33 contacts with the end of the splined coupling 32. As the worm shaft 2 is moved to the left, the end of the piston 41 clears the inlet port 51 permitting the cylinder 42 to be primed or filled with fluid from the reservoir 50. When valve closing movement of the apparatus is again effected, the worm shaft 2 and piston 41 will tend to move in a right-hand direction with respect to Fig. 3. Such right-hand movement would meet with little or no resistance until the end of the piston 41 closes the inlet port 51. As soon as the port 51 is closed, however, further right-hand movement of the worm shaft 2 and piston 41 can result only by the escape of fluid through the outlet port 52 and past the valve 53. Since such fluid escape is limited and resisted by virtue of the spring-loaded valve 53, there will result a hydraulic resistance to the movement of the piston 41 and worm shaft 2. The parts 43, 45 and 46 connecting the piston to the torque control switch 47 are so adjusted that the drive motor will be stopped at a predetermined point after the worm shaft 2 and piston 41 have overcome the hydraulic resistance. By regulating the adjustment of the compression spring 55, the end thrust upon the worm shaft 2 can be controlled and coincidentally the amount of power or torque supplied through the control unit to the valve stem shaft 13.

The hydraulic resistance means for controlling the application of torque to the valve stem shaft is of a constant and uniform nature throughout its period of operation and does not increase in proportion to the distance of travel of the piston 41 and worm shaft 2. By virtue of this hydraulic resistance means, a much more accurate adjustment and operation of the torque control means is possible than has heretofore been attained.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:

1. In a power driven valve operating control unit, the combination of power driving means, a rotatable member adapted to move the stem of said valve, a reduction worm gear train driven by said driving means, said reduction worm gear train being connected to said rotatable member, control means for starting and stopping said driving means, the worm shaft of said gear train being longitudinally movable, means connecting said worm shaft to said control means for operating the latter, hydraulic means for resisting the longitudinal movement of said worm shaft, and means for adjustably regulating the resistance of said hydraulic means.

2. In a power driven valve operating control unit, the combination of power driving means, a rotatable member adapted to move the stem of said valve, a reduction worm gear train driven by said driving means, said reduction worm gear train being connected to said rotatable member, control means for starting and stopping said driving means, the worm shaft of said gear train being longitudinally movable, means connecting said worm shaft to said control means for operating the latter, a hydraulic piston connected to said worm shaft and longitudinally movable in unison therewith, a cylinder for said piston, and inlet and outlet ports admitting and emitting fluid respectively from said cylinder whereby to resist the longitudinal movement of said piston and of said worm shaft.

3. In a power driven valve operating control unit, the combination of power driving means, a rotatable member adapted to move the stem of said valve, a reduction worm gear train driven by said driving means, said reduction worm gear train being connected to said rotatable member, control means for starting and stopping said driving means, the worm shaft of said gear train being longitudinally movable, means connecting said worm shaft to said control means for operating the latter, a hydraulic piston connected to said worm shaft and longitudinally movable in unison therewith, a cylinder for said piston, inlet and outlet ports admitting and emitting fluid respectively from said cylinder whereby to resist the longitudinal movement of said piston and of said worm shaft, and adjustable valve means in said outlet port for regulating the flow of fluid therethrough and for regulating the resistance to the aforesaid longitudinal movement.

GEORGE H. ACKER.